(12) United States Patent
Hao et al.

(10) Patent No.: US 11,845,671 B2
(45) Date of Patent: Dec. 19, 2023

(54) METHOD FOR PREPARING CARBON-FUNCTIONALIZED $PR_6O_{11}$

(71) Applicant: ZHEJIANG NORMAL UNIVERSITY XINGZHI COLLEGE, Jinhua (CN)

(72) Inventors: Shiyou Hao, Jinhua (CN); Juan Shang, Jinhua (CN); Xuanyi Wu, Jinhua (CN); Zhonglian Xiao, Jinhua (CN)

(73) Assignee: ZHEJIANG NORMAL UNIVERSITY ZINGZHI COLLEGE, Jinhua (CN)

( * ) Notice: Subject to any disclaimer, the term of this patent is extended or adjusted under 35 U.S.C. 154(b) by 185 days.

(21) Appl. No.: 17/458,590

(22) Filed: Aug. 27, 2021

(65) Prior Publication Data

US 2022/0169523 A1 Jun. 2, 2022

(30) Foreign Application Priority Data

Aug. 19, 2020 (CN) ........................ 2020108398082.4

(51) Int. Cl.
*C01F 17/30* (2020.01)

(52) U.S. Cl.
CPC ................................... *C01F 17/30* (2020.01)

(58) Field of Classification Search
CPC ........ B01J 35/004; B01J 21/18; B01J 37/033; B01J 37/0072; B01J 37/084; B01J 23/10; C01F 17/32; C01F 17/10; C01F 17/224
See application file for complete search history.

(56) References Cited

FOREIGN PATENT DOCUMENTS

CN 107335422 A * 11/2017 ............... B01J 23/10

OTHER PUBLICATIONS

Liang et al. (The effect of Praseodymium on the adsorption and photocatalytic degradation of azo dye in aqueous Pr3+-TiO2 suspension, Chemical Engineering Journal, 2009) (Year: 2009).*

(Continued)

*Primary Examiner* — Colin W. Slifka
*Assistant Examiner* — Logan Edward Laclair (57) ABSTRACT

A method for preparing carbon-functionalized praseodymium oxide includes the following steps: dissolving $Pr(NO_3)_3 \cdot 6H_2O$ in an acid dye solution and stirring to form a mixed solution; adding $NH_3H_2O$ dropwise in the mixed solution while stirring to adjust a pH value of the mixed solution, thereby forming a suspension, and then aging the suspension for 2 to 4 hours; filtering, washing with water, washing with alcohol, and drying the aged suspension to obtain a carbon-functionalized $Pr_6O_{11}$ precursor; and placing the carbon-functionalized $Pr_6O_{11}$ precursor in a tube furnace under a protection of nitrogen, heating the carbon-functionalized $Pr_6O_{11}$ precursor to a sintering temperature at a heating rate of 4 to 6 degrees Celsius/min, keeping at the sintering temperature for 3 to 4 hours, and then cooling to room temperature, thereby obtaining the carbon-functionalized $Pr_6O_{11}$.

8 Claims, 5 Drawing Sheets

(56) References Cited

OTHER PUBLICATIONS

Pei et al. (Synthesis and characterization of Pr6O11 and Ag/Pr6O11 nanorods and their photocatalytic activity toward dye degradation, Materials Letters, 2017) (Year: 2017).*

Machine translation of CN-107335422-A (Year: 2017).*

First-OA-CN issued in corresponding application No. 202010839082. 4, dated May 9, 2022.

Hui Wang, Preparation of CeO2 • xH2O, CeO2@C and their performance on dye removal, "China Excellent Master's Degree Thesis Full-text Database (Master) Engineering Science and Technology I Series", pp. 18-44.

* cited by examiner

METHOD FOR PREPARING CARBON-FUNCTIONALIZED PR$_6$O$_{11}$

CROSS-REFERENCE TO RELATED APPLICATION

This application is based upon and claims the benefit of priority from Chinese Patent Application No. 202010839082.4, filed on Aug. 19, 2020, the entire contents or which are incorporated herein by reference.

TECHNICAL FIELD

The subject matter herein generally relates to composite oxide preparation, specially relates to a method for preparing carbon-functionalized Pr$_6$O$_{11}$.

BACKGROUND

With the industrialization in the past, the environment has been greatly damaged by organic pollutants, heavy metal ions, carbon dioxide, etc., greatly disrupting the environmental balance. In order to remove the above-mentioned environmentally damaging substances, many methods have been proposed, such as adsorption, membrane separation, and photocatalysis. Among the above methods, the photocatalytic method is favored by researchers due to its low cost, simple operation, and complete removal of environmental damage.

A large number of studies have shown that the main factors affecting the efficiency of photocatalysis are as follows: (1) the absorption efficiency of the catalyst for light, especially visible light; (2) the adsorption efficiency of the catalyst for pollutants; (3) the yield and separation of photo-generated electrons and holes efficiency. Therefore, in response to the above factors, researchers have proposed a variety of measures to improve the photocatalytic efficiency. Carbon materials, such as graphene, C$_3$N$_4$, activated carbon, etc., have attracted much attention due to their high adsorption and absorption efficiency for pollutants and visible light, as well as being a good conductor of photogenerated electrons.

Among all the rare earth elements, praseodymium oxides have many different phases and have different oxygen concentrations. Under normal temperature and pressure, Pr$_6$O$_{11}$ is the most stable and is a typical n-type semiconductor with a band gap of 1.7 eV to 3.3 eV Therefore, it has better photocatalytic efficiency. In order to further improve the photocatalytic efficiency of Pr$_6$O$_{11}$, the synthesis of carbon-fuctionalized Pr$_6$O$_{11}$ is an effective way. Shende et al. synthesized Pr$_6$O$_{11}$/g-C$_3$N$_4$ composite material using C$_3$N$_4$ as the carbon source. The photocatalytic efficiency of this material is much higher than that of pure Pr$_6$O$_{11}$ or g-C$_3$N$_4$.

In the following existing Chinese patent documents, the relevant patents disclose the preparation method of carbon-functionalized rare earth oxides.

CN106206068A with a tittle of "A preparation method of carbon nanotube composite nano ceria electrode material" discloses a method for preparing a carbon nanotube composite nano ceria electrode material by a hydrothermal method via using Ce(NO$_3$)$_3$·6H$_2$O, polyvinylpyrrolidone, and modified carbon nanotubes as raw materials.

CN107335422A with a tittle of "A preparation method of carbon-functionalized cerium oxide" discloses a preparation method of carbon-functionalized cerium oxide by high-temperature calcination CeO$_2$·xH$_2$O@dye. CeO$_2$·xH$_2$O@dye is formed by adsorbing the dye in the dye solution by CeO$_2$·xH$_2$O. CeO$_2$·xH$_2$O is synthesized by Ce(NO$_3$)$_3$.6H$_2$O as raw material and ammonia water as a precipitant.

CN101264883 with a title of "Preparation method of core-shell structure composite material of rare earth metal oxide and carbon nanotube" discloses a method for preparing uniform and stable structure of rare earth metal oxide and carbon nanotube core-shell structure composite by using a reflux feeding method. Specifically, the carbon nanotubes are evenly dispersed in the ethylene glycol solution including rare earth nitrate and polyvinylpyrrolidone, and the rare earth metal oxide is covered on the surface of the carbon nano-tube through heating reflux to form a core-shell structure.

At present, in the preparation process of carbon-functionalized rare earth oxides, the carbon materials used are generally commercial products (such as C$_3$N$_4$, carbon nanotubes) The bonding force between carbon materials and rare oxides is weak, which easily causes the photoelectron conduction at the interface between the rare earth oxide and the carbon material to be hindered, and reduces the efficiency of photoelectron and hole separation. In addition, although dyes are used as carbon sources to synthesize carbon-functionalized rare earth oxides, this method is to synthesize rare earth oxide precursors first, then adsorb the dyes, and synthesize the target product through calcination, which easily leads to non-uniform distribution of rare earth oxides and carbon in the final product and thus the decrease of photocatalytic efficiency of the resulted materials.

Therefore, there is room for improvement within the art.

SUMMARY

The disclosure provides a method for preparing carbon-functionalized praseodymium oxide with high-efficiency photocatalytic degradation efficiency for organic substances (using acid red 14 as a probe molecule).

In one aspect, a method for preparing carbon-functionalized praseodymium oxide includes the following steps:
1) Pr(NO$_3$)$_3$·6H$_2$O was dissolved in an acid dye solution and stirred to form an uniform mixed solution.
2) NH$_3$·H$_2$O was dropwise added the mixed solution while stirring to adjust a pH value of the mixed solution, thereby forming a suspension, and then the suspension was aged for 2 hours to 4 hours.
3) A carbon-functionalized Pr$_6$O$_{11}$ precursor was obtained by filtering, washing with water, washing with alcohol, and drying the aged suspension.
4) The carbon-functionalized Pr$_6$O$_{11}$ precursor was placed in a tube furnace, under a protection of nitrogen, heated to a sintering temperature at a heating rate of 4 to 6 degrees Celsius/min, kept the sintering temperature for 3 to 4 hours, and then naturally cooled to room temperature, thereby obtaining the carbon-functionalized Pr$_6$O$_{11}$.

In at least one embodiment, a mass of Pr(NO$_3$)$_3$·6H$_2$O dissolved in the acid dye solution is in a range of 0.8 g to 1.2 g.

In at least one embodiment, the acid dye solution comprises at least one acid dye selected from a group consisting of Acid Red 14, Acid Red 17, and any combination thereof, as carbon sources, in order to obtain the carbon-functionalized Pr$_6$O$_{11}$ with a higher photocatalytic efficiency.

In at least one embodiment, a concentration of the acid dye solution is in a range of 0.05 mmol/L to 0.10 mmol/L.

In at least one embodiment, in the mixed solution, $Pr(NO_3)_3 \cdot 6H_2O$ was completely dissolved in the acid dye solution.

In at least one embodiment, the pH value of the mixed solution was adjusted to 8.0 to 9.5 by $NH_3 \cdot H_2O$, to completely precipitate $Pr(OH)_3$ and acid dyes from the mixed solution at the same time to obtain the suspension.

In at least one embodiment, the carbon-functionalized $Pr_6O_{11}$ precursor comprises $Pr(OH)_3$ and acid dyes, $Pr(OH)_3$ and the acid dyes were uniformly dispersed, and in the carbon-functionalized $Pr_6O_{11}$, $Pr_6O_{11}$ and C were uniformly dispersed.

In at least one embodiment, the sintering temperature is in a range of 550 to 650 degrees Celsius, which improves the photocatalytic efficiency of the carbon-functionalized $Pr_6O_{11}$.

In the above method, $Pr(NO_3)_3 \cdot 6H_2O$ was completely dissolved in the acid dye solution. By adjusting the pH value of the mixed solution, $Pr(OH)_3$ and the acid dyes were simultaneously precipitated from the mixed solution, so that $Pr(NO_3)_3 \cdot 6H_2O$ and acid dyes were uniformly mixed when being precipitated from the mixed solution. Therefore, $Pr_6O_{11}$ and C in the carbon-functionalized $Pr_6O_{11}$ were uniformly mixed when being sintered. Since $Pr(OH)_3$ and the acid dyes were simultaneously precipitated from the mixed solution, the carbon converted from the acid dyes may easily form a carbon bond with Pr and O during sintering, which is conducive to photo-induced electron transfer. Since the $Pr_6O_{11}$ and C in the carbon-functionalized $Pr_6O_{11}$ are uniformly mixed, the carbon-functionalized $Pr_6O_{11}$ has high absorption of visible light.

Figure 1:
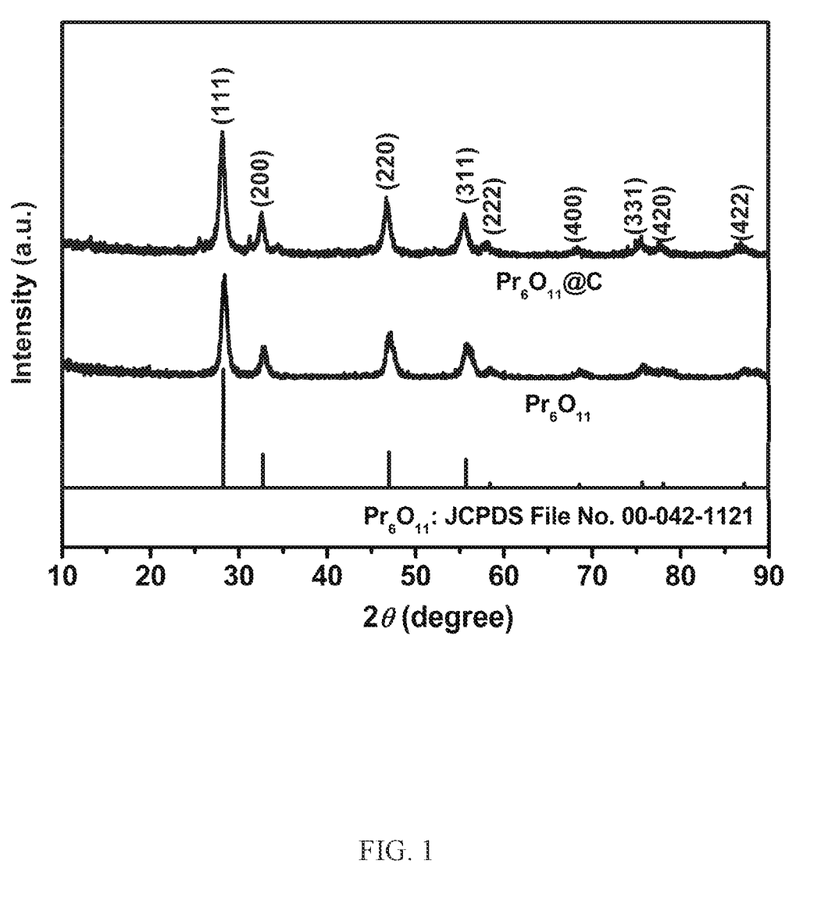
FIG. 1 is an X-Ray diffraction spectrum of $Pr_6O_{11}$ and carbon-functionalized $Pr_6O_{11}$.
Figure 2:
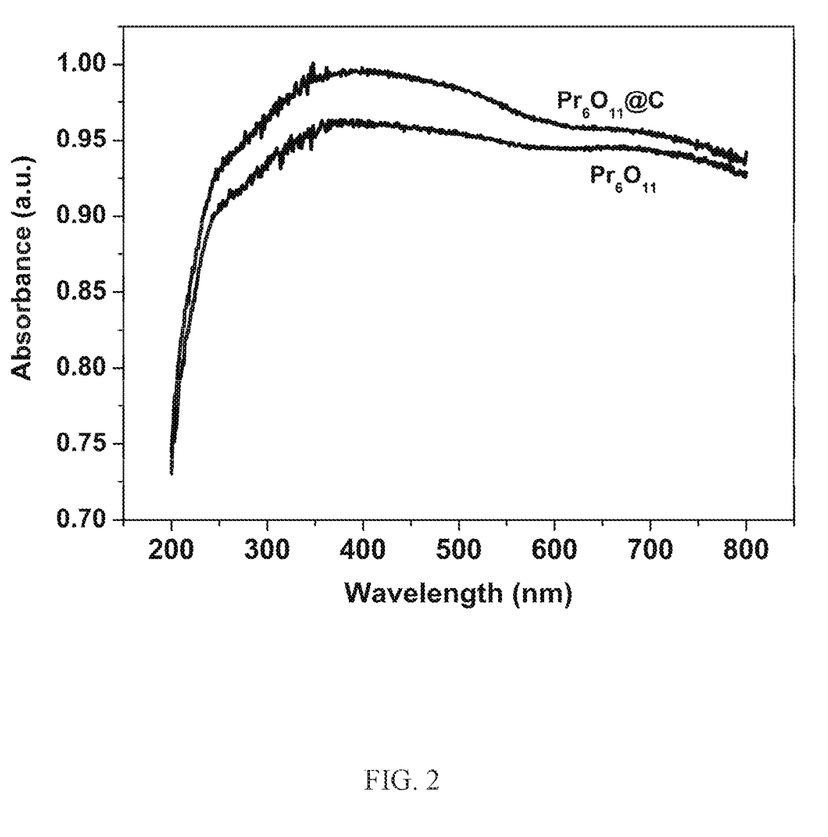
FIG. 2 is an ultraviolet-visible light absorption spectrum of $Pr_6O_{11}$ and carbon-functionalized $Pr_6O_{11}$.
Figure 3A:
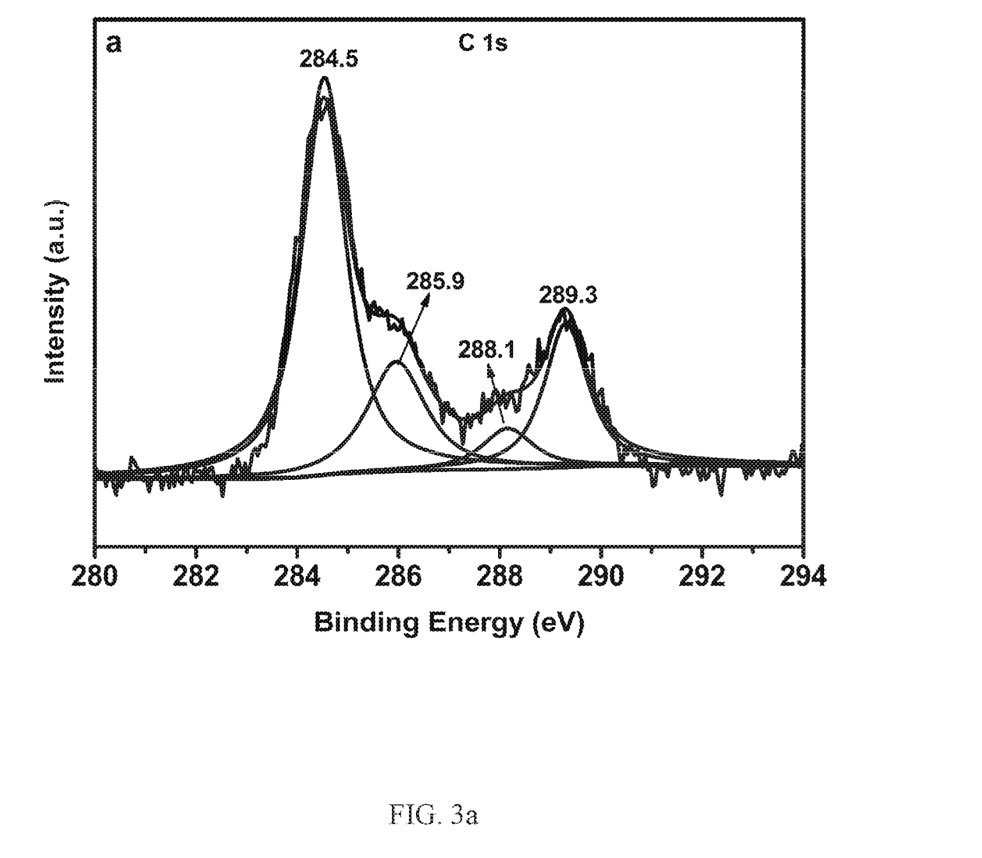
FIG. 3a is an XPS spectrum of $Pr_6O_{11}$ and carbon-functionalized $Pr_6O_{11}$ showing C 1s peaks.
Figure 3B:
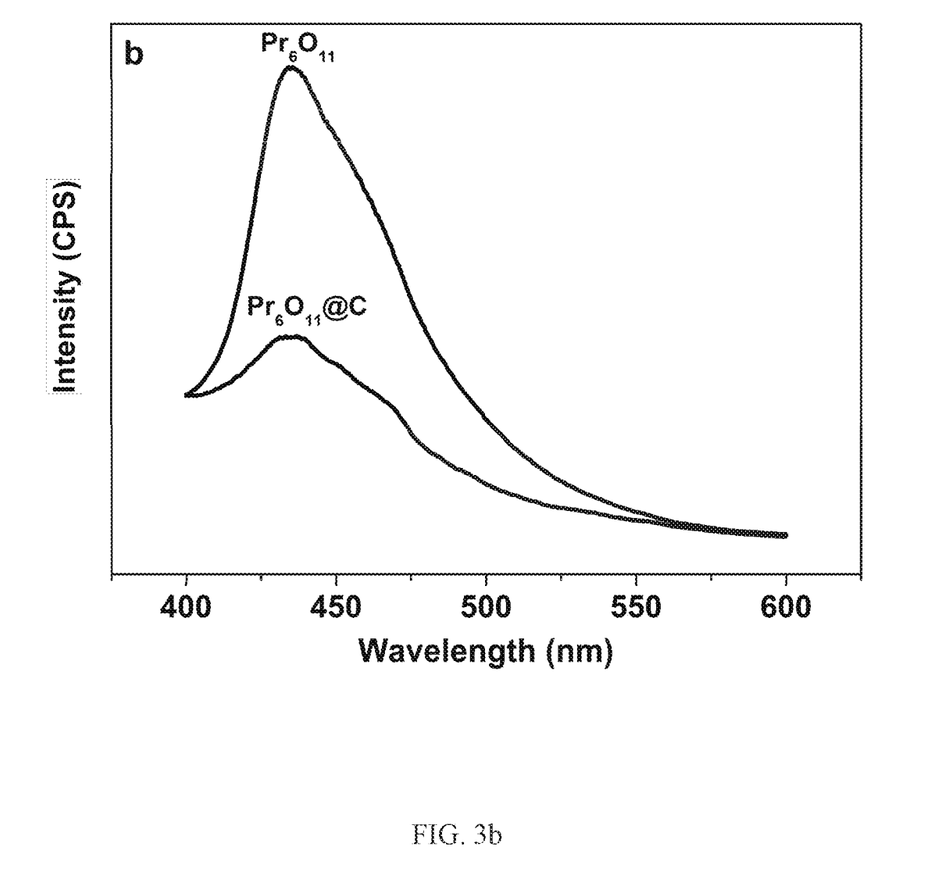
FIG. 3b is a fluorescence spectrum of $Pr_6O_{11}$ and carbon-functionalized $Pr_6O_{11}$.
Figure 4:
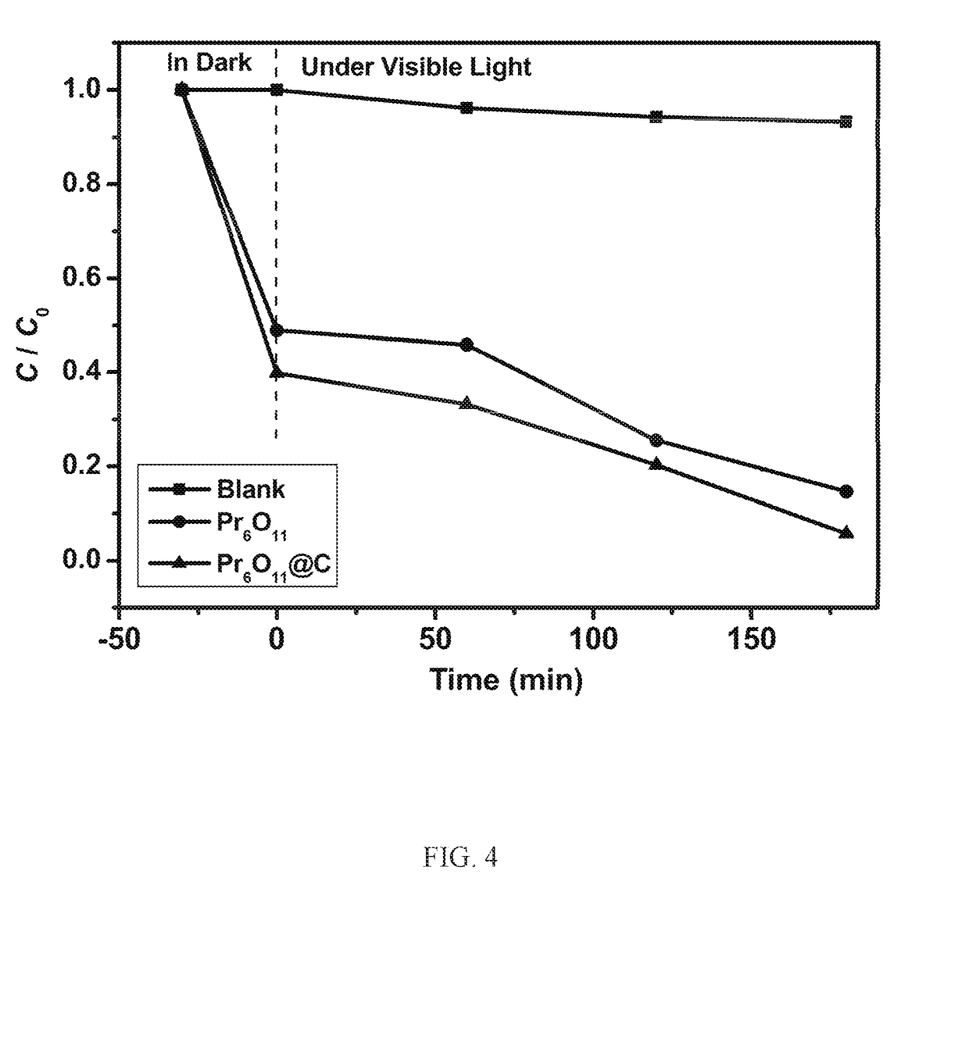
FIG. 4 is a catalytic degradation efficiency image of $Pr_6O_{11}$ and carbon-functionalized $Pr_6O_{11}$ for Acid Red 14 under visible light irradiation, wherein the Acid Red 14 solution has a concentration of 0.2 mM, a volume of 20 mL, a catalyst mass of 20 mg, and a pH value of 6.

The above method is ingenious, simple, and easy to implement, and the materials synthesized from it has an efficient removal effect for dyes and other pollutants. In FIG. 1, the synthesized product has characteristic peaks of $Pr_6O_{11}$ at crystal planes such as (111), (200) and (220), and the peak position of the corresponding crystal plane is consistent with the standard card (JCPDS File No.-00-042-1121), which proves that the synthesized product is $Pr_6O_{11}$. After the carbon is functionalized, the UV-visible light absorption intensity of the carbon-functionalized $Pr_6O_{11}$ is higher than that of $Pr_6O_{11}$, which is shown in FIG. 2. As shown in FIG. 3a, in the carbon-functionalized samples, obvious peaks appear at 284.5 eV, 285.9 eV, 288.1 eV, and 289.3 eV, and these peaks may be attributed to bonds such as C—O bond, C—C bond, C=C bond, which proves that the samples include carbon bonds, thereby facilitating the separation of photo-induced electrons and holes. Therefore, the fluorescence emission spectrum intensity of the carbon-functionalized material is weak (shown in FIG. 3b). The carbon-functionalized $Pr_6O_{11}$ improves the adsorption efficiency of dyes and increases the intensity of visible light absorption, and the formation of carbon bonds facilitates the separation of photo-induced electrons and holes. Thus the carbon-functionalized $Pr_6O_{11}$ has better photocatalytic degradation efficiency for related dyes (such as Acid Red 14, shown in FIG. 4).

In summary, the carbon-functionalized praseodymium oxide prepared by the present disclosure has high dye adsorption capacity, high light absorption (especially visible light absorption) intensity. The formed carbon bond may efficiently separate photo-generated electrons and holes. The carbon-functionalized praseodymium oxide prepared by the method of the present disclosure has the advantage of using visible light to efficiently degrade Acid Red 14. Thus, the carbon-functionalized praseodymium oxide prepared by the present disclosure has potential application value in the photocatalytic degradation of organic pollutants.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like.

Embodiment 1

0.8 g of $Pr(NO_3)_3 \cdot 6H_2O$ was dissolved in 80 mL of an acid dye solution with a concentration of 0.05 mmol/L, and stirred to form an uniform mixed solution. $NH_3 \cdot H_2O$ with a mass percentage of 25% was dropwise added in the mixed solution while stirring to adjust the pH value of the mixed solution to 8.0, thereby forming a suspension, and then the suspension was aged for 2 hours. A carbon-functionalized $Pr_6O_{11}$ precursor was obtained by filtering, washing with water, washing with alcohol, and drying the aged suspension. The carbon-functionalized $Pr_6O_{11}$ precursor was placed in a tube furnace, under a protection of nitrogen, heated to 550 degrees Celsius at a heating rate of 4 degrees Celsius/min, kept 550 degrees Celsius for 3 hours, and then naturally cooled to room temperature, thereby obtaining the carbon-functionalized $Pr_6O_{11}$.

Embodiment 2

0.8 g of $Pr(NO_3)_3 \cdot 6H_2O$ was dissolved in 100 mL of an acid dye solution with a concentration of 0.75 mmol/L and stirred to form an uniform mixed solution. NH$_3$·H$_2$O with a mass percentage of 25% was dropwise added in the mixed solution while stirring to adjust the pH value of the mixed solution to 8.5, thereby forming a suspension, and then the suspension was aged for 3 hours. A carbon-functionalized Pr$_6$O$_{11}$ precursor was obtained by filtering, washing with water, washing with alcohol, and drying the aged suspension. The carbon-functionalized Pr$_6$O$_{11}$ precursor was placed in a tube furnace, under a protection of nitrogen, heated to 600 degrees Celsius at a heating rate of 5 degrees Celsius/min, kept 600 degrees Celsius for 3.5 hours, and then naturally cooled to room temperature, thereby obtaining the carbon-functionalized Pr$_6$O$_{11}$.

Embodiment 3

0.8 g of Pr(NO$_3$)$_3$·6H$_2$O was dissolved in 120 mL of an acid dye solution with a concentration of 0.10 mmol/L and stirred to form an uniform mixed solution. NH$_3$·H$_2$O with a mass percentage of 25% was dropwise added in the mixed solution while stirring to adjust the pH value of the mixed solution to 9.5, thereby forming a suspension, and then the suspension was aged for 4 hours. A carbon-functionalized Pr$_6$O$_{11}$ precursor was obtained by filtering, washing with water, washing with alcohol, and drying the aged suspension. The carbon-functionalized Pr$_6$O$_{11}$ precursor was placed in a tube furnace, under a protection of nitrogen, heated to 650 degrees Celsius at a heating rate of 6 degrees Celsius/min, kept 650 degrees Celsius for 4 hours, and then naturally cooled to room temperature, thereby obtaining the carbon-functionalized Pr$_6$O$_{11}$.

Embodiment 4

1.0 g of Pr(NO$_3$)$_3$.6H$_2$O was dissolved in 80 mL of an acid dye solution with a concentration of 0.05 mmol/L and stirred to form an uniform mixed solution. NH$_3$·H$_2$O with a mass percentage of 25% was dropwise added in the mixed solution while stirring to adjust the pH value of the mixed solution to 8.0, thereby forming a suspension, and then the suspension was aged for 2 hours. A carbon-functionalized Pr$_6$O$_{11}$ precursor was obtained by filtering, washing with water, washing with alcohol, and drying the aged suspension. The carbon-functionalized Pr$_6$O$_{11}$ precursor was placed in a tube furnace, under a protection of nitrogen, heated to 550 degrees Celsius at a heating rate of 4 degrees Celsius/min, kept 550 degrees Celsius for 3 hours, and then naturally cooled to room temperature, thereby obtaining the carbon-functionalized Pr$_6$O$_{11}$.

Embodiment 5

1.0 g of Pr(NO$_3$)$_3$.6H$_2$O was dissolved in 100 mL of an acid dye solution with a concentration of 0.75 mmol/L and stirred to form an uniform mixed solution. NH$_3$·H$_2$O with a mass percentage of 25% was dropwise added in the mixed solution while stirring to adjust the pH value of the mixed solution to 8.5, thereby forming a suspension, and then the suspension was aged for 3 hours. A carbon-functionalized Pr$_6$O$_{11}$ precursor was obtained by filtering, washing with water, washing with alcohol, and drying the aged mixed solution. The carbon-functionalized Pr$_6$O$_{11}$ precursor was placed in a tube furnace, under a protection of nitrogen, heated to 600 degrees Celsius at a heating rate of 5 degrees Celsius/min, kept 600 degrees Celsius for 3.5 hours, and then naturally cooled to room temperature, thereby obtaining the carbon-functionalized Pr$_6$O$_{11}$.

Embodiment 6

1.0 g of Pr(NO$_3$)$_3$·6H$_2$O was dissolved in 120 mL of an acid dye solution with a concentration of 0.10 mmol/L and stirred to form an uniform mixed solution. NH$_3$H$_2$O with a mass percentage of 25% was dropwise added in the mixed solution while stirring to adjust the pH value of the mixed solution to 9.5, thereby forming a suspension, and then the suspension was aged for 4 hours. A carbon-functionalized Pr$_6$O$_{11}$ precursor was obtained by filtering, washing with water, washing with alcohol, and drying the aged mixed solution. The carbon-functionalized Pr$_6$O$_{11}$ precursor was placed in a tube furnace, under a protection of nitrogen, heated to 650 degrees Celsius at a heating rate of 6 degrees Celsius/min, kept 650 degrees Celsius for 4 hours, and then naturally cooled to room temperature, thereby obtaining the carbon-functionalized Pr$_6$O$_{11}$.

Embodiment 7

1.2 g of Pr(NO$_3$)$_3$·6H$_2$O was dissolved in 80 mL of an acid dye solution with a concentration of 0.05 mmol/L and stirred to form an uniform mixed solution. NH$_3$·H$_2$O with a mass percentage of 25% was dropwise added in the mixed solution while stirring to adjust the pH value of the mixed solution to 8.0, thereby forming a suspension, and then the suspension was aged for 2 hours. A carbon-functionalized Pr$_6$O$_{11}$ precursor was obtained by filtering, washing with water, washing with alcohol, and drying the aged mixed solution. The carbon-functionalized Pr$_6$O$_{11}$ precursor was placed in a tube furnace, under a protection of nitrogen, heated to 550 degrees Celsius at a heating rate of 4 degrees Celsius/min, kept 550 degrees Celsius for 3 hours, and then naturally cooled to room temperature, thereby obtaining the carbon-functionalized Pr$_6$O$_{11}$.

Embodiment 8

1.2 g of Pr(NO$_3$)$_3$·6H$_2$O was dissolved in 100 mL of an acid dye solution with a concentration of 0.75 mmol/L and stirred to form an uniform mixed solution. NH$_3$·H$_2$O with a mass percentage of 25% was dropwise added in the mixed solution while stirring to adjust the pH value of the mixed solution to 8.5, thereby forming a suspension, and then the suspension was aged for 3 hours. A carbon-functionalized Pr$_6$O$_{11}$ precursor was obtained by filtering, washing with water, washing with alcohol, and drying the aged suspension. The carbon-functionalized Pr$_6$O$_{11}$ precursor was placed in a tube furnace, under a protection of nitrogen, heated to 600 degrees Celsius at a heating rate of 5 degrees Celsius/min, kept 600 degrees Celsius for 3.5 hours, and then naturally cooled to room temperature, thereby obtaining the carbon-functionalized Pr$_6$O$_{11}$.

Embodiment 9

1.2 g of Pr(NO$_3$)$_3$·6H$_2$O was dissolved in 120 mL, of an acid dye solution with a concentration of 0.10 mmol/L, and stirred to form an uniform mixed solution. NH$_3$·H$_2$O with a mass percentage of 25% was dropwise added in the mixed solution while stirring to adjust the pH value of the mixed solution to 9.5, thereby forming a suspension, and then the suspension was aged for 4 hours. A carbon-functionalized Pr$_6$O$_{11}$ precursor was obtained by filtering, washing with water, washing with alcohol, and drying the aged mixed solution. The carbon-functionalized $Pr_6O_{11}$ precursor was placed in a tube furnace, under a protection of nitrogen, heated to 650 degrees Celsius at a heating rate of 6 degrees Celsius/min, kept 650 degrees Celsius for 4 hours, and then naturally cooled to room temperature, thereby obtaining the carbon-functionalized $Pr_6O_{11}$.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for preparing carbon-functionalized $Pr_6O_{11}$ comprising:
    dissolving $Pr(NO_3)_3 \cdot 6H_2O$ in an acid dye solution and stirring to form a mixed solution;
    adding $NH_3 \cdot H_2O$ dropwise in the mixed solution while stirring to adjust a pH value of the mixed solution, thereby forming a suspension, and then aging the suspension for 2 to 4 hours;
    filtering, washing with water, washing with alcohol, and drying the aged suspension to obtain a carbon-functionalized $Pr_6O_{11}$ precursor; and
    placing the carbon-functionalized $Pr_6O_{11}$ precursor in a tube furnace and under a protection of nitrogen, heating the carbon-functionalized $Pr_6O_{11}$ precursor to a sintering temperature at a heating rate of 4 to 6 degrees Celsius/min, keeping at the sintering temperature for 3 to 4 hours, and then cooling to room temperature, thereby obtaining the carbon-functionalized $Pr_6O_{11}$.

2. The method for preparing carbon-functionalized $Pr_6O_{11}$ of claim 1, wherein the acid dye solution comprises at least one acid dye selected from a grouts consisting of Acid Red 14, Acid Red 17, and any combination thereof.

3. The method for preparing carbon-functionalized $Pr_6O_{11}$ of claim 2, wherein a concentration of the acid dye solution is in a range of 0.05 mmol/L to 0.10 mmol/L.

4. The method for preparing carbon-functionalized $Pr_6O_{11}$ of claim 1, wherein in the mixed solution, $Pr(NO_3)_3 \cdot 6H_2O$ is completely dissolved in the acid dye solution.

5. The method for preparing carbon-functionalized $Pr_6O_{11}$ of claim 1, wherein the pH value of the suspension is adjusted to 8.0 to 9.5 by $NH_3 \cdot H_2O$ to precipitate $Pr(OH)_3$ and acid dyes from the mixed solution simultaneously to obtain the suspension.

6. The method for preparing carbon-functionalized $Pr_6O_{11}$ of claim 1, wherein the carbon-functionalized $Pr_6O_{11}$ precursor comprises $Pr(OH)_3$ and acid dyes, $Pr(OH)_3$ and the acid dyes are uniformly dispersed, and after heating, in the carbon-functionalized $Pr_6O_{11}$, $Pr_6O_{11}$ and C are uniformly dispersed.

7. The method for preparing carbon-functionalized $Pr_6O_{11}$ of claim 1, wherein the sintering temperature is in a range of 550 to 650 degrees Celsius.

8. The method for preparing carbon-functionalized $Pr_6O_{11}$ of claim 1, Wherein a mass percentage of $NH_3 \cdot H_2O$ is 25%.

* * * * *